(12) United States Patent
Kawatani

(10) Patent No.: US 11,386,066 B2
(45) Date of Patent: Jul. 12, 2022

(54) INFORMATION PROCESSING DEVICE, METHOD, AND PROGRAM WITH SESSION TABLE STORING PLURALITY OF CHAINS

(71) Applicant: NIPPON TELEGRAPH AND TELEPHONE CORPORATION, Tokyo (JP)

(72) Inventor: Muneyuki Kawatani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/977,474

(22) PCT Filed: Mar. 25, 2019

(86) PCT No.: PCT/JP2019/012597
§ 371 (c)(1),
(2) Date: Sep. 2, 2020

(87) PCT Pub. No.: WO2019/189029
PCT Pub. Date: Oct. 3, 2019

(65) Prior Publication Data
US 2021/0056092 A1 Feb. 25, 2021

(30) Foreign Application Priority Data
Mar. 29, 2018 (JP) .............................. JP2018-064298

(51) Int. Cl.
*G06F 16/23* (2019.01)
*G06F 9/52* (2006.01)
*H04L 67/143* (2022.01)

(52) U.S. Cl.
CPC .......... *G06F 16/2343* (2019.01); *G06F 9/524* (2013.01); *H04L 67/143* (2013.01)

(58) Field of Classification Search
CPC ...... G06F 16/23; G06F 16/902; G06F 16/958; G06F 16/2343; G06F 9/46; G06F 9/52;
(Continued)

(56) References Cited

U.S. PATENT DOCUMENTS

2005/0050188 A1* 3/2005 Davis .................... G06F 16/902
707/E17.038
2010/0260174 A1* 10/2010 Preiss ...................... H04L 45/42
370/389

(Continued)

FOREIGN PATENT DOCUMENTS

JP 2014-154057 A 8/2014
WO 02/44905 A1 6/2002

OTHER PUBLICATIONS

"How to implement Session timeout in Web Server Side?", Web literature, Mar. 13, 2018, https://stackoverflow.com/questions/2574929/how-to-implement-session-timeout-in-web-server-side.

*Primary Examiner* — James N Fiorillo
(74) *Attorney, Agent, or Firm* — Xsensus LLP

(57) ABSTRACT

An information processing device (10) is an information processing device in which is implemented a session table, and includes a storage unit (12) that stores a session table, in which is recorded session information having session content and holding time point of the session, a locking unit (133) that locks at least a region of the session table that is an object of processing, during processing on the session information, a searching unit (134) that scans session information of the session table after locking, and searches for session information that is an object of processing, and a deleting unit (135) that, in a case where the session information of which the holding time point has expired is discovered at the time of scanning by the searching unit
(Continued)

(134), the session information of which the holding time point has expired is deleted from the session table.

5 Claims, 16 Drawing Sheets

(58) Field of Classification Search
CPC . G06F 9/524; G06F 13/00; G06F 3/00; G06F 15/16; H04L 67/143; H04L 29/08
USPC .......................................................... 709/227
See application file for complete search history.

(56) References Cited

U.S. PATENT DOCUMENTS

| | | | |
|---|---|---|---|
| 2015/0277802 A1* | 10/2015 | Oikarinen | G06F 3/0689 |
| | | | 711/114 |
| 2017/0094447 A1* | 3/2017 | Sasaki | H04W 12/06 |
| 2017/0272816 A1* | 9/2017 | Olds | H04L 67/306 |
| 2018/0025067 A1* | 1/2018 | Tsuchihashi | G06F 16/275 |
| | | | 707/610 |
| 2018/0077243 A1* | 3/2018 | Mathew | H04L 67/143 |
| 2018/0198867 A1* | 7/2018 | Dao | H04L 41/0893 |
| 2018/0349432 A1* | 12/2018 | Yamada | G06F 16/23 |
| 2019/0372899 A1* | 12/2019 | Zhou | H04L 47/74 |

\* cited by examiner

INFORMATION PROCESSING DEVICE, METHOD, AND PROGRAM WITH SESSION TABLE STORING PLURALITY OF CHAINS

CROSS-REFERENCE TO RELATED APPLICATIONS

The present application is based on PCT filing PCT/JP2019/012597, filed Mar. 25, 2019, which claims priority to JP 2018-064298, filed Mar. 29, 2018, the entire contents of each are incorporated herein by reference.

TECHNICAL FIELD

The present invention relates to an information processing device, an information processing method, and an information processing program.

BACKGROUND ART

An information processing device that processes sessions has a session table and a timer list. When a session is added to the session table, this information processing device adds that information as a timer to the timer list. When the timer recognizes that the holding time point of the session has expired, the information processing device cancels that session, and deletes that timer from the timer list. Now, when adding/deleting sessions and adding/deleting timers, the information processing device locks each of the session table and timer list, and manages so that there are no inconsistencies with each other.

CITATION LIST

Non Patent Literature

[NPL 1] How to implement Session timeout in Web Server Side?, [online], [searched Mar. 13, 2018], Internet <URL: https://stackoverflow.com/questions/2574929/how-to-implement-session-timeout-in-web-server-side>

SUMMARY OF THE INVENTION

Technical Problem

However, in conventional information processing devices, the session table and timer list are each locked when adding/deleting sessions and adding/deleting timers, so the number of times of performing lock acquisition at the time of session table operations is great, and there have been cases where the frequency of lock conflict occurring is high. There also has been a problem with conventional management device in that processing costs for operations of data structures that manage timers is a necessity.

The present invention has been made in light of the above situation, and it is an object thereof to provide an information processing device, information processing method, and information processing program whereby the number of times of performing lock acquisition at the time of session table operations can be reduced as compared with conventional arrangements, and also processing costs can be reduced.

Means for Solving the Problem

In order to solve the above-described problem and achieve the object, an information processing device according to the present invention is an information processing device in which is implemented a session table, is an information processing device that includes a storage unit that stores a session table, in which is recorded session information having session content and holding time point of the session, a locking unit that locks at least a region of the session table that is an object of processing, during processing on the session information, a searching unit that scans session information of the session table after locking by the locking unit, and searches for session information that is an object of processing, and a deleting unit that, in a case where the session information of which the holding time point has expired is discovered at the time of scanning by the searching unit, the session information of which the holding time point has expired is deleted from the session table.

Effects of the Invention

According to the present invention, the number of times of performing lock acquisition at the time of session table operations can be reduced as compared with conventional arrangements, and also processing costs can be reduced.

DESCRIPTION OF EMBODIMENTS

An embodiment of the present invention will be described in detail below with reference to the Figures. Note that this embodiment does not limit the present invention. Also, parts that are the same are denoted by the same symbols in the Figures.

Embodiment

Figure 1:
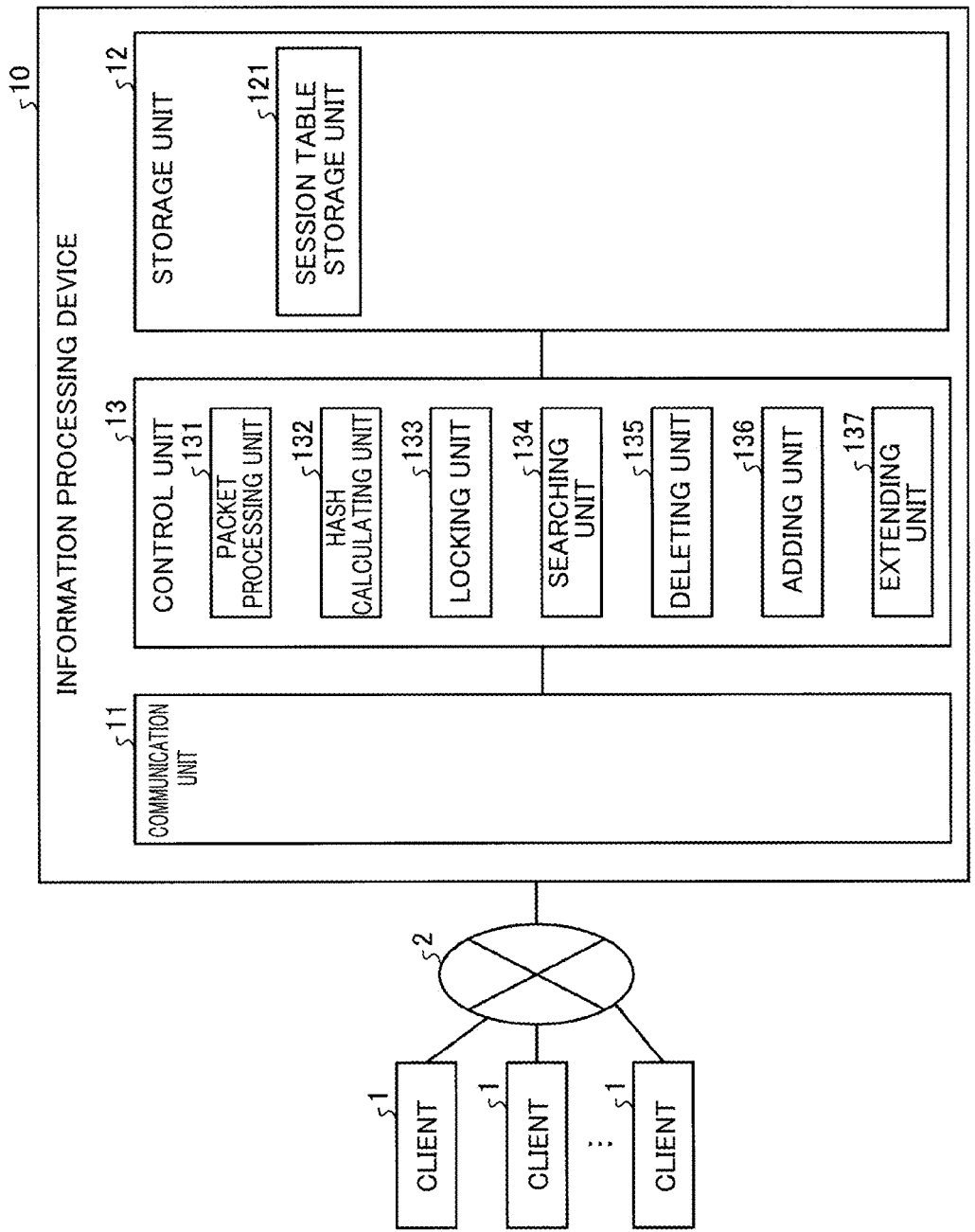
FIG. 1 is a diagram illustrating an example of a configuration of a communication system according to an embodiment.

The embodiment of the present invention will be described. FIG. 1 is a diagram illustrating an example of a configuration of a communication system according to the embodiment.

The communication system according to the embodiment has a plurality of clients 1, and an information processing device 10, for example, as illustrated in FIG. 1. The clients 1 and the information processing device 10 are connected via a network 2 or the like.

The clients 1 are devices that communicate with the information processing device 10.

The information processing device 10 performs communication among the clients 1. After having performed various types of processing on the basis of the reception packet from a client 1, for example, the information processing device 10 transmits, to the client 1, a reply packet to this reception packet.

A session table, where session information regarding sessions of each packet is recorded, is implemented in the information processing device 10, whereby sessions are managed. Here, the information processing device 10 embeds holding time points of the sessions in session information of the session table, and is able to recognize the holding time points of sessions just by scanning each of the session information. In other words, in the process of searching for session information, the information processing device 10 confirms holding time points of session information that has been scanned. In a case where a holding time point has expired, the information processing device 10 deletes the session information at this timing. Note that the while performing processing as to session information such as searching or the like, the information processing device 10 locks the region that is the object of processing in the session table.

[Configuration of Information Processing Device]

Next, the configuration of the information processing device 10 will be described with reference to FIG. 1. The information processing device 10 has a communication unit 11, a storage unit 12, and a control unit 13, as illustrated in FIG. 1.

The communication unit 11 is a communication interface that transmits and receives various types of information to and from other devices connected via the network 2 or the like. The communication unit 11 is realized by a NIC (Network Interface Card) or the like, and performs communication between other devise and the control unit 13 (described later) via an electric communication line such as a LAN (Local Area Network), the Internet, or the like.

The storage unit 12 is realized by, for example, a semiconductor memory element such as RAM (Random Access Memory), flash memory (Flash Memory), or the like, or a storage device such as a hard disk, optical disc, or the like, and stores processing programs to operate the information processing device 10, data used when running the processing programs, and so forth. The storage unit 12 has a session table storage unit 121.

The session table storage unit 121 stores a session table. The session table stores session information that contains session content of each packet and holding time point of the session. A case where a chain-structure session table is used as a session table, and a hash method is employed where a hash function is used to decide chains of the session table storing session information, will be described in the present embodiment. Accordingly, each piece of session information in the session table belongs to a chain corresponding to a hash value of that session information.

The control unit 13 controls the overall information processing device 10. The control unit 13 has internal memory for storing programs defining various types of processing procedures and so forth, and necessary data, and executes various types of processing thereby. The control unit 13 is an electronic circuit such as a CPU (Central Processing Unit) or MPU (Micro Processing Unit) or the like, for example. The control unit 13 also functions as various types of processing units by various types of programs operating. The control unit 13 has a packet processing unit 131, a hash calculating unit 132, a locking unit 133, a searching unit 134, a deleting unit 135, an adding unit 136, and an extending unit 137.

The packet processing unit 131 processes packets in communication with a client 1, for example. The packet processing unit 131 performs various types of processing on the basis of a reception packet from the client 1, and thereafter transmits a reply packet to this reception packet to the client 1.

The hash calculating unit 132 calculates, at the time of a search for session information being performed in a session table, the hash value of session information that is the object of the search.

The locking unit 133 locks at least a processing object region of the session table during processing regarding session information. More specifically, the locking unit 133 locks a chain corresponding to a hash value that the hash calculating unit 132 has calculated. Upon the processing regarding the session information ending, the locking unit 133 cancels (unlocks) the lock.

The searching unit 134 scans the session table for session information after the locking unit 133 has performed locking. The searching unit 134 acquires a key of session information that is the object of processing. The searching unit 134 then scans each piece of session information of the locked chain, and searches for session information having a key that matches the acquired key. The searching unit 134 confirms holding time points of session information during the process of searching for this session information. Note that key matches may be, in addition to complete matches, partial matches.

In a case where session information is found in which the holding time point has expired at the time of the scan performed by the searching unit 134, the deleting unit 135 deletes the session information of which the holding time point has expired from the session table. Accordingly, the deleting unit 135 deletes both the session content of which the holding time point has expired and the holding time point of this session, simply by deleting the session information from the session table.

In a case where the searching unit 134 was not able to find session information of a newly-received packet (session information that is the object of adding) in the session table, the adding unit 136 adds session information of the packet that is the object of adding to the session table. At this time, the adding unit 136 adds the session information of the newly-received packet to a predetermined position (e.g., at the end) of the chain corresponding to the hash value of the session information.

Also, in a case where the searching unit 134 finds session information that is the object of adding in the session table, the adding unit 136 overwrites that session information in accordance with the session that is the object of adding. At this time, the adding unit 136 also extends and updates the holding time point in addition to the session content of the session information.

The extending unit 137 extends and updates the holding time point of the session information of the packet that the packet processing unit 131 has received. In a case where the searching unit finds session information of the received packet in the session table, the extending unit 137 extends and updates the holding time point of the session information that the searching unit 134 has found.

[Flow for Processing of Addition of Session Information to Session Table]

Figure 2:
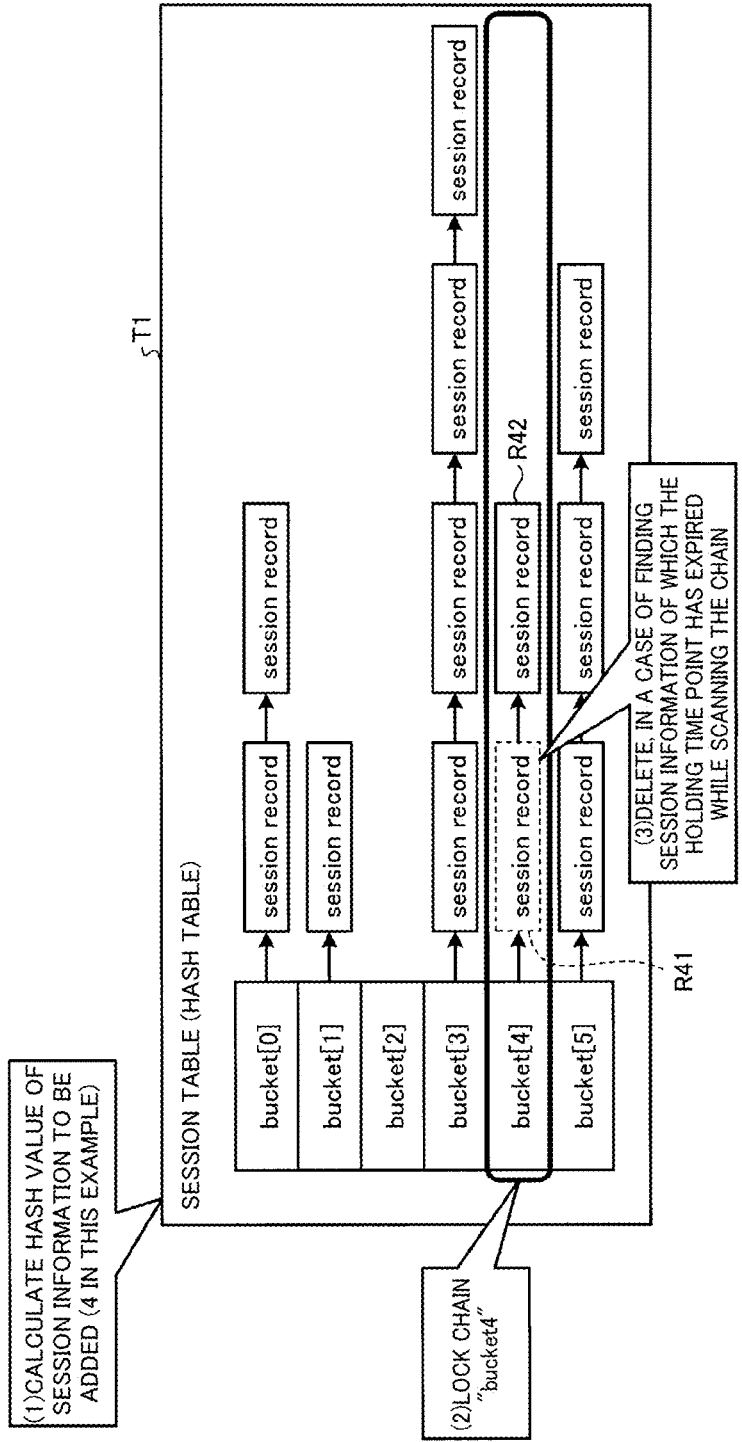
FIG. 2 is a diagram for describing a flow for processing where the information processing device illustrated in FIG. 1 adds session information to a session table.
Figure 3:
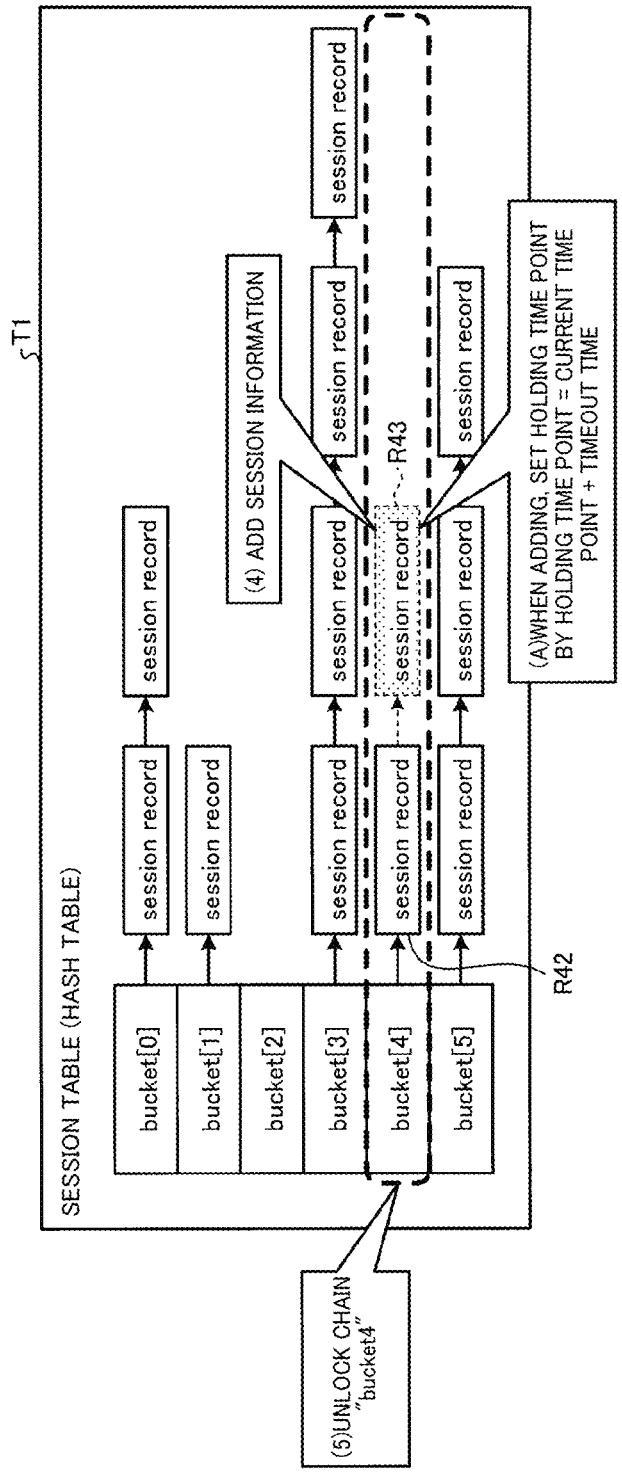
FIG. 3 is a diagram for describing a flow for processing where the information processing device illustrated in FIG. 1 adds session information to the session table.

Processing of the information processing device 10 adding session information to the session table will be described next. FIG. 2 and FIG. 3 are diagrams for describing a flow for processing where the information processing device 10 illustrated in FIG. 1 adds session information to a session table. An example of a session table (hash table) implemented in the information processing device 10 is illustrated in FIG. 2 and FIG. 3, and the flow of processing of adding session information to the session table will be described.

The information processing device 10 has a chain of "bucket0" through "bucket5", corresponding to respective hash values "0" through "5", as illustrated in FIG. 2 and FIG. 3. A session record (session information) is linked to each of the "bucket0" through "bucket5". Session information is linked to the chain corresponding to the hash value of this session information.

First, the hash calculating unit 132 calculates the hash value of the hash session information of the session information to be added (see (1) in FIG. 2). In the example this time, the hash value of the session information to be added was calculated to be "4".

The locking unit 133 then locks the chain "bucket4" corresponding to the hash value "4" of the session information to be added (see (2) in FIG. 2). Next, the searching unit 134 sequentially scans each piece of session information in the locked chain "bucket4", and searches for session information having a key that matches the key of the session information to be added. In a case where the searching unit 134 discovers session information R41 where the holding time point has expired, while scanning the chain "bucket4", the deleting unit 135 deletes this session information R41 from the chain "bucket4" (see (3) in FIG. 2).

In a case where the searching unit 134 was not able to find session information of the packet that is the object of adding in the chain "bucket4", the adding unit 136 adds session information R43 of the packet that is the object of adding to the end of the chain "bucket4" (see (4) in FIG. 3). At this time, the adding unit 136 computes and sets the holding time point for the session information to be added as holding time point=current time point+timeout time (see (A) in FIG. 3). Thus, the adding unit 136 embeds a holding time point for the session in the session information.

Upon the processing by the adding unit 136 ending, the locking unit 133 next unlocks the chain "bucket4" (see (5) in FIG. 3), and the processing of adding session information ends. Note that referencing (searching) sessions is executed by a flow the same as the processing illustrated in FIG. 2 and FIG. 3, except that there is no processing of adding session information to the chain (see (4) in FIG. 3).

[Flow for processing of Extension of Holding Time Point of Session Information]

Figure 4:
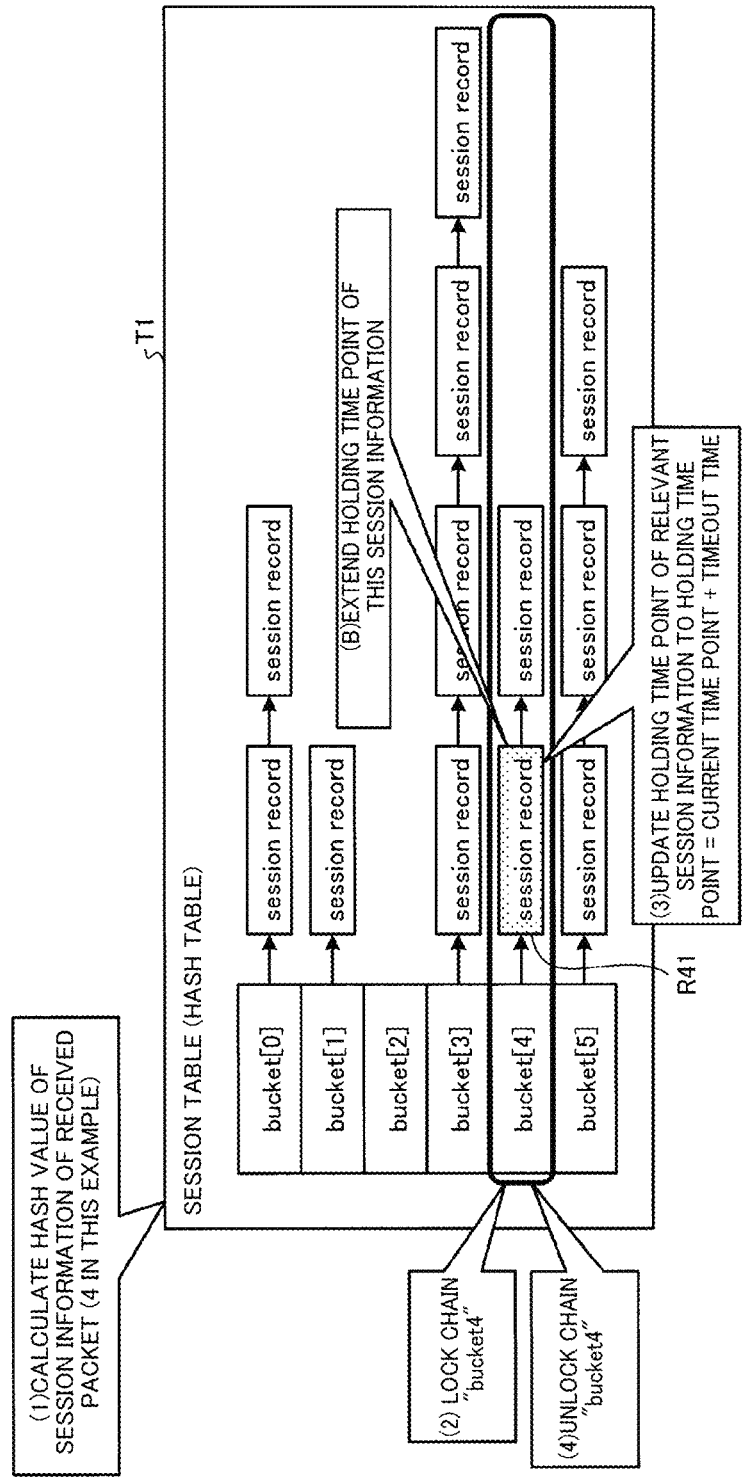
FIG. 4 is a diagram for describing a flow for processing of the information processing device illustrated in FIG. 1 extending a holding time point of session information in the session table.

Next, processing of the information processing device 10 extending the holding time point of session information in the session table will be described. FIG. 4 is a diagram for describing a flow for processing of the information processing device 10 illustrated in FIG. 1 extending the holding time point of session information in the session table.

First, the hash calculating unit 132 calculates the hash value "4" of session information (session information that is the object of extension) of a received packet (see (1) in FIG. 4). The locking unit 133 then locks the chain "bucket4" corresponding to the hash value "4" of this session information (see (2) in FIG. 4).

Next, the searching unit 134 sequentially scans each piece of session information in the locked chain "bucket4", and searches for session information having a key that matches the key of the session information of the received packet. The extending unit 137 extends the holding time point of relevant session information R41 that has been found as a result of searching by the searching unit 134 (see (B) in FIG. 4). At this time, the adding unit 136 computes and updates the holding time point for the relevant session information R41 as holding time point=current time point+timeout time (see (3) in FIG. 4). Note that in a case where the searching unit 134 discovers session information where the holding time point has expired while scanning the chain "bucket4", the deleting unit 135 deletes this session information from the session table T1.

Upon the processing by the extending unit 137 ending, the locking unit 133 next unlocks the chain "bucket4" (see (4) in FIG. 4), and the processing of extending the holding time point of session information ends.

[Processing Procedures for Processing of Searching for Session Information in Session Table]

Figure 5:
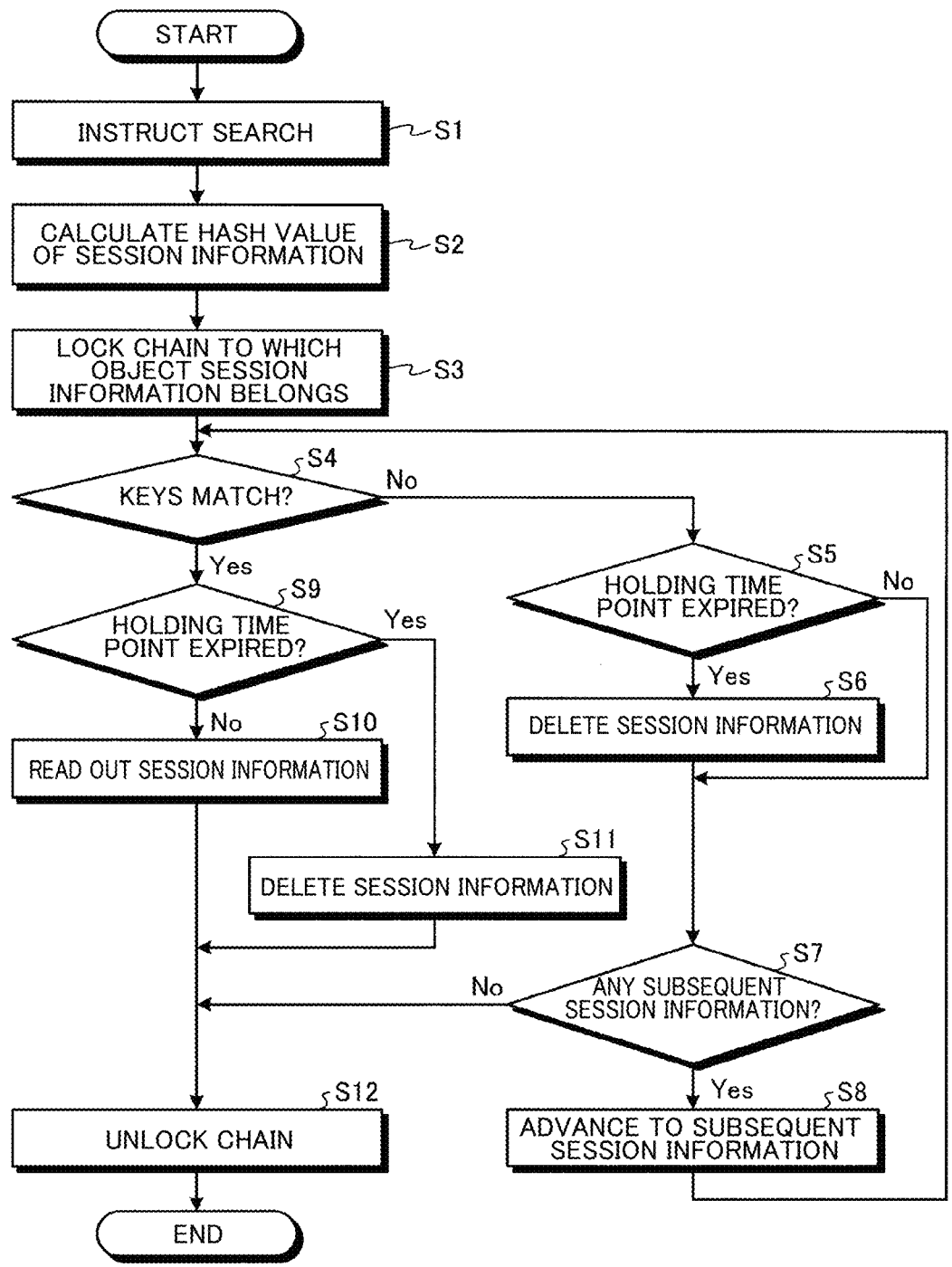
FIG. 5 is a flowchart illustrating an example of processing procedures for processing of the information processing device illustrated in FIG. 1 searching for session information in the session table.

Next, processing procedures for processing of the information processing device 10 searching for session information in the session table will be described. FIG. 5 is a flowchart illustrating an example of processing procedures for processing of the information processing device 10 illustrated in FIG. 1 searching for session information in the session table.

Upon receiving an instruction to search for session information (step S1), the hash calculating unit 132 calculates a hash value for the session information that is the object of the search (step S2), as illustrated in FIG. 5. The locking unit 133 locks the chain to which the session information that is the object of the search belongs (step S3).

The searching unit 134 sequentially scans the session information in the chain that has been locked. Specifically, the searching unit 143 determines whether or not the key of session information that has been scanned matches the key of the session information that is the object of the search (step S4).

In a case of determining that the key of the session information that has been scanned does not match the key of the session information that is the object of the search (Step S4: No), the searching unit 134 determines whether or not the holding time point of this session information has expired (step S5). In a case of the searching unit 134 determining that the holding time point of the session information has expired (Step S5: Yes), the deleting unit 135 deletes this session information from the session table (step S6).

The searching unit 134 then determines whether or not there is subsequent session information (step S7). In a case of determining that there is subsequent session information (step S7: Yes), the searching unit 134 advances to the subsequent session information (step S8), returns to step S4, and determines whether or not the key of the subsequent session information matches the key of the session information that is the object of the search.

Also, in a case of determining that the key of the session information that has been scanned matches the key of the session information that is the object of the search (Step S4: Yes), the searching unit 134 determines whether or not the holding time point of this session information has expired (step S9). In a case of the searching unit 134 determining that the holding time point of the session information has not expired (Step S9: No), this session information is determined to be the session information that is the object of the search, and this session information is read out (step S10).

Meanwhile, in a case where the searching unit 134 determines that the holding time point of the session information has expired (step S9: Yes), the deleting unit 135 deletes this session information from the session table (step S11).

In a case of the searching unit 134 determining that there is no subsequent session information (step S7: No), after the processing of step S10, or after the processing of step S11, the locking unit 133 unlocks the chain that had been locked (step S12), and the processing of searching for session information ends. In this way, in a case of session information where the holding time point has expired having been discovered at the timing of searching for session information, that session information is deleted from the session table in the information processing device 10.

[Processing Procedures for Processing of Adding Session Information to Session Table]

Figure 6:
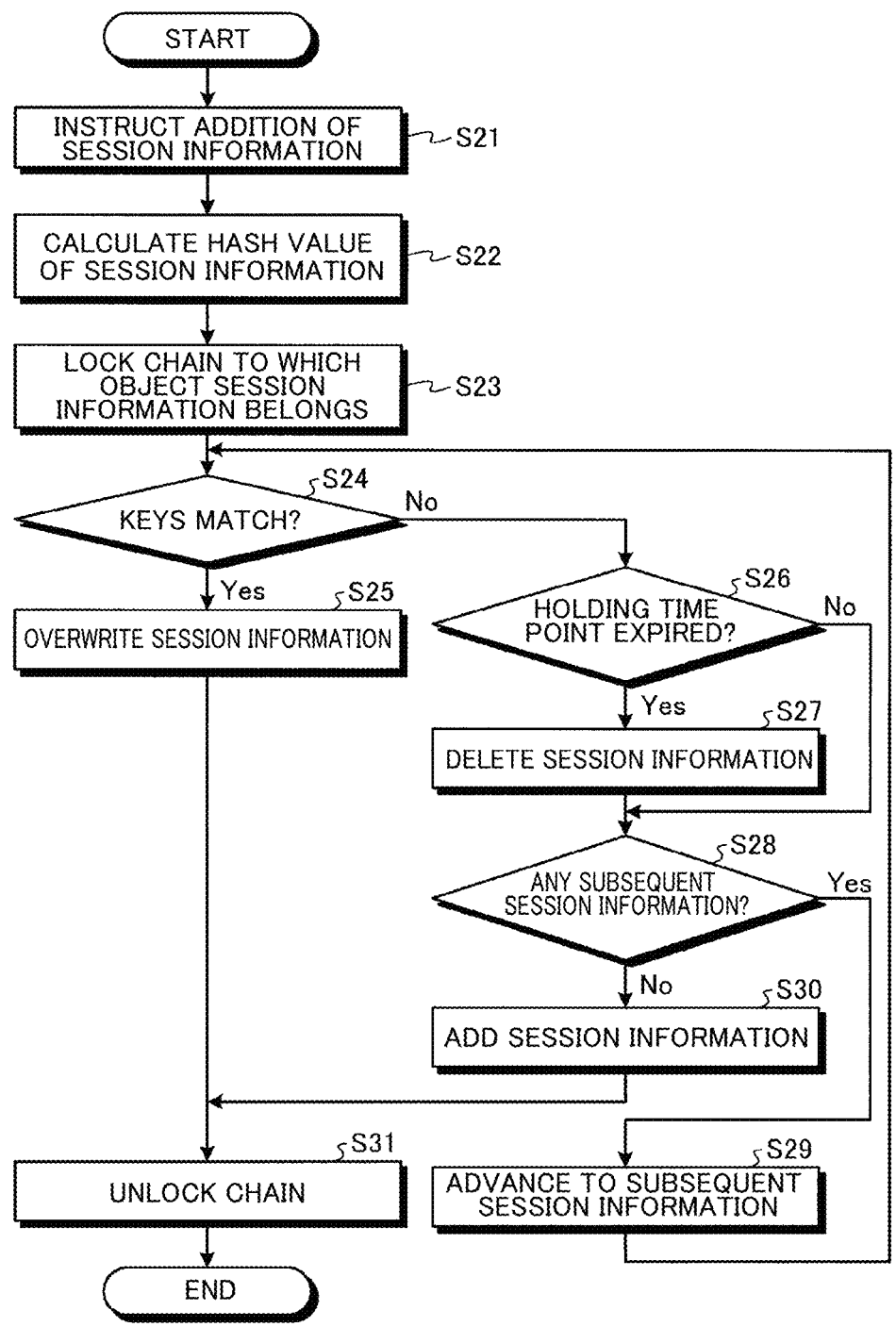
FIG. 6 is a flowchart illustrating an example of processing procedures for processing of the information processing device illustrated in FIG. 1 adding session information to the session table.

Next, processing procedures for processing of the information processing device 10 adding session information to the session table will be described. FIG. 6 is a flowchart illustrating an example of processing procedures for processing of the information processing device 10 illustrated in FIG. 1 adding session information to the session table.

Upon receiving an instruction to add session information, by packet processing performed by the packet processing unit 131 or the like (step S21), the hash calculating unit 132 calculates a hash value for the session information that is the object of adding (step S22), as illustrated in FIG. 6. The locking unit 133 locks the chain to which the session information that is the object of adding belongs (step S23).

The searching unit 134 determines, with regard to session information that has been scanned out of the locked chain, whether or not the key of the session information matches the key of the session information that is the object of adding (step S24).

In a case of determining that the key of the session information that has been scanned matches the key of the session information that is the object of adding (Step S24: Yes), the searching unit 134 determines that this session information is session information that is the object of adding. The adding unit 136 then overwrites that session information in accordance with the session that is the object of adding (step S25). At this time, in addition to the session content of the session information, the adding unit 136 also extends and updates the holding time point.

Conversely, in a case of determining that the key of the session information that has been scanned does not match the key of the session information that is the object of adding (Step S24: No), the searching unit 134 carries out step S26 through S29. Step S26 through S29 are the same processing as that of step S5 through S8 illustrated in FIG. 5.

In a case of the searching unit 134 determining that there is no subsequent session information (step S28: No), the adding unit 136 then adds the session information that is the object of adding to the session table (step S30). At this time, the adding unit 136 adds the session information that is the object of adding to a predetermined position (e.g., at the end) of the chain corresponding to the hash value of the session information.

After the processing of step S25, or after the processing of step S30, the locking unit 133 unlocks the chain that had been locked (step S31), and the processing of adding session information ends.

[Processing Procedures for Processing of Extending Holding Time Point of Session Information]

Figure 7:
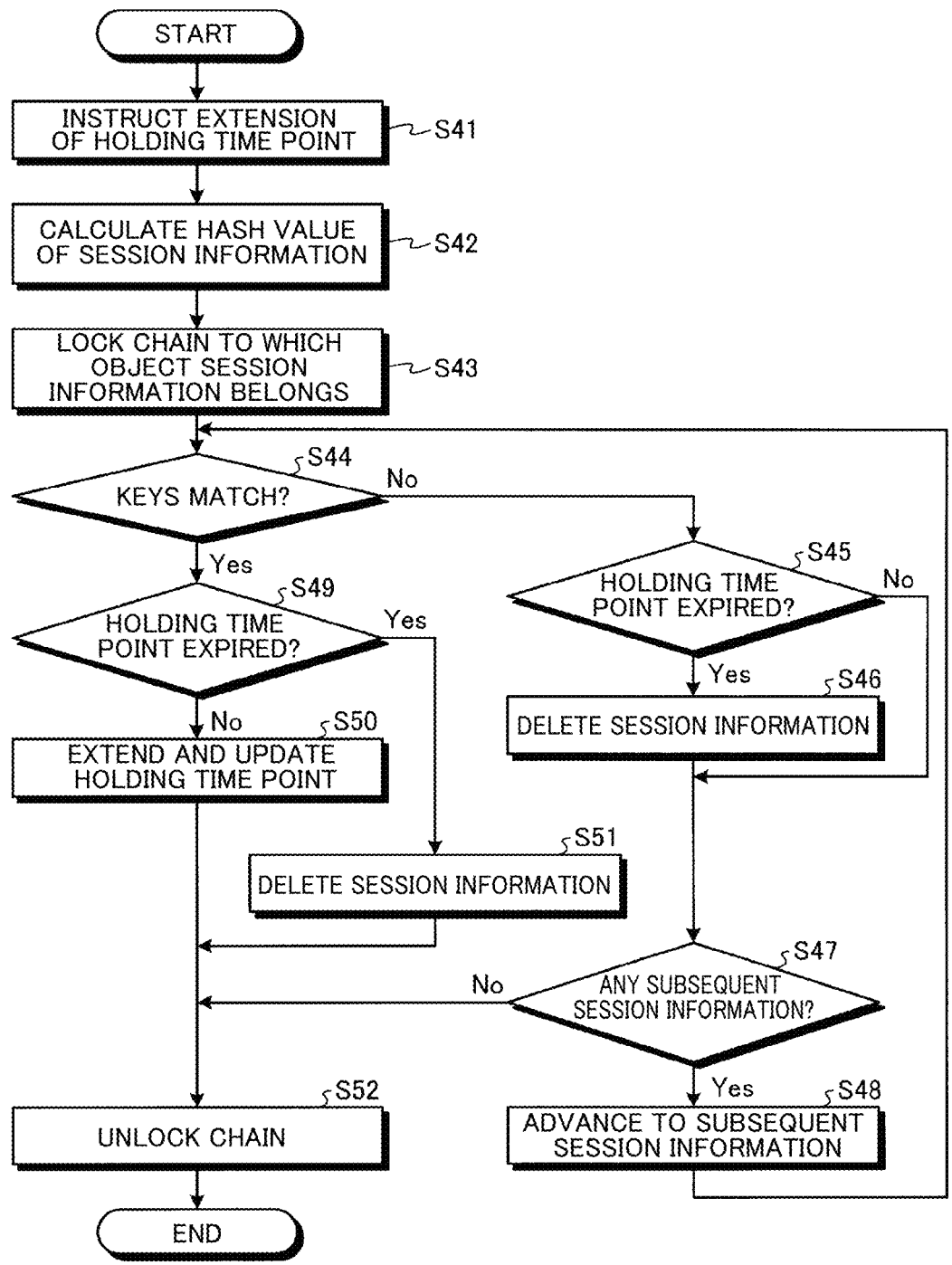
FIG. 7 is a flowchart illustrating an example of processing procedures for processing of the information processing device illustrated in FIG. 1 extending a holding time point of session information in the session table.

Next, processing procedures for processing of the information processing device 10 extending the holding time point of session information in the session table will be described. FIG. 7 is a flowchart illustrating an example of processing procedures for processing of the information processing device 10 illustrated in FIG. 1 extending the holding time point of session information in the session table.

Upon receiving an instruction to extend the holding time point of session information by packet processing performed by the packet processing unit 131 or the like (step S41), the hash calculating unit 132 calculates a hash value for the session information that is the object of extending (step S42), as illustrated in FIG. 7. The locking unit 133 locks the chain to which the session information that is the object of extending belongs (step S43).

The searching unit 134 determines, with regard to session information that has been scanned out of the locked chain, whether or not the key of the session information matches the key of the session information that is the object of extending (step S44).

In a case of determining that the key of the session information does not match the key of the session information that is the object of extending (Step S44: No), the searching unit 134 carries out step S45 through step S48. Step S45 through step S48 are the same processing as that of step S5 through S8 illustrated in FIG. 5.

Also, in a case of determining that the key of the session information that has been scanned matches the key of the session information that is the object of extending (Step S44: Yes), the searching unit 134 determines whether or not the holding time point of this session information has expired (step S49). In a case of the searching unit 134 determining that the holding time point of the session information has not expired (Step S49: No), this session information is determined to be the session information that is the object of extending, and the extending unit 137 extends and updates the holding time point of this session information (step S50).

Conversely, in a case of the searching unit 134 determining that the holding time point of the session information has expired (Step S49: Yes), the deleting unit 135 deletes this session information from the session table (step S51).

In a case of the searching unit 134 determining that there is no subsequent session information (step S47: No), or after the processing of step S50, or after the processing of step S51, the locking unit 133 then unlocks the chain that had been locked (step S52), and the processing of extending the holding time point of session information ends.

[Description of Conventional Technology]

Figure 8:
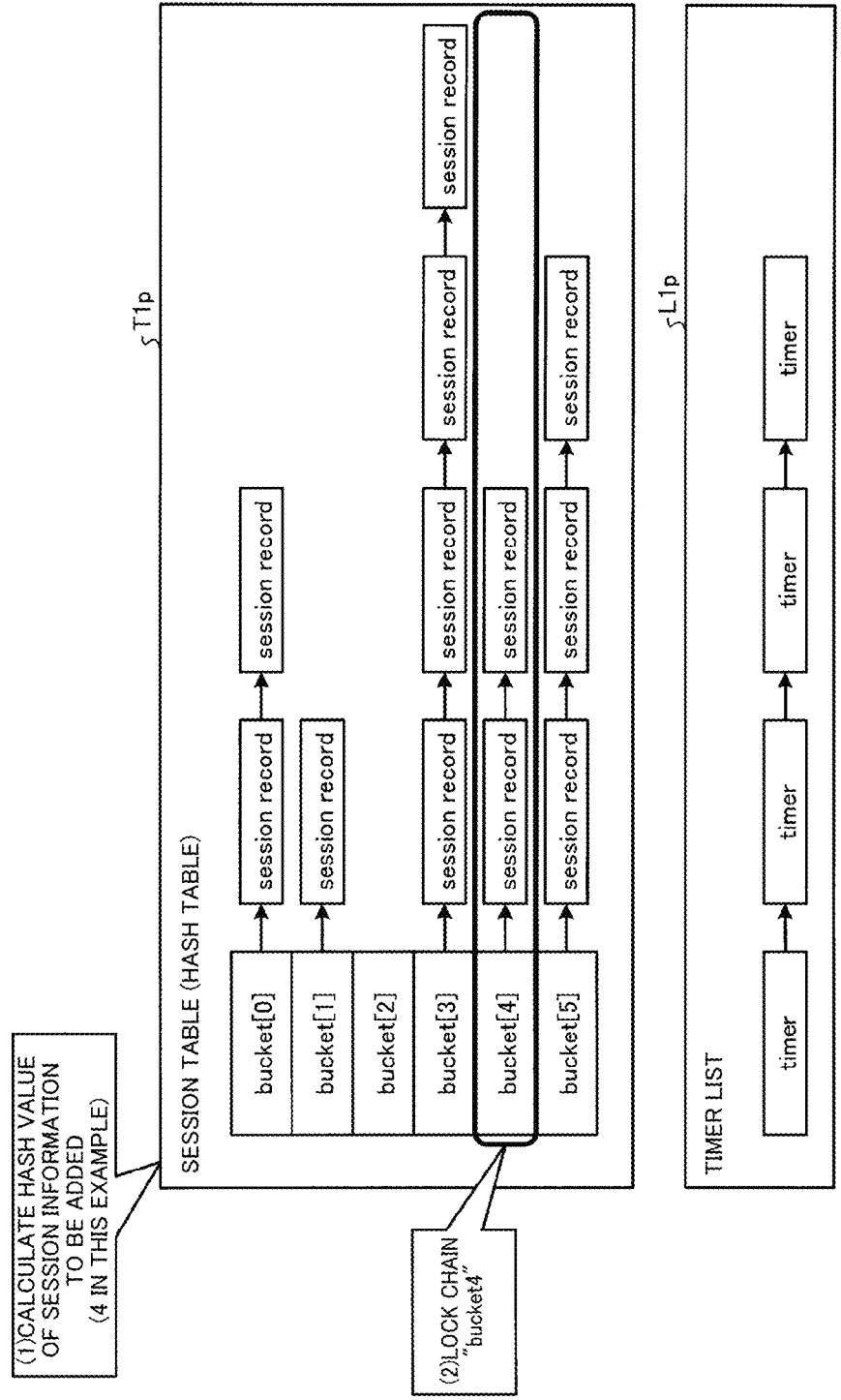
FIG. 8 is a diagram for describing a flow for processing of adding session information in conventional technology.
Figure 9:
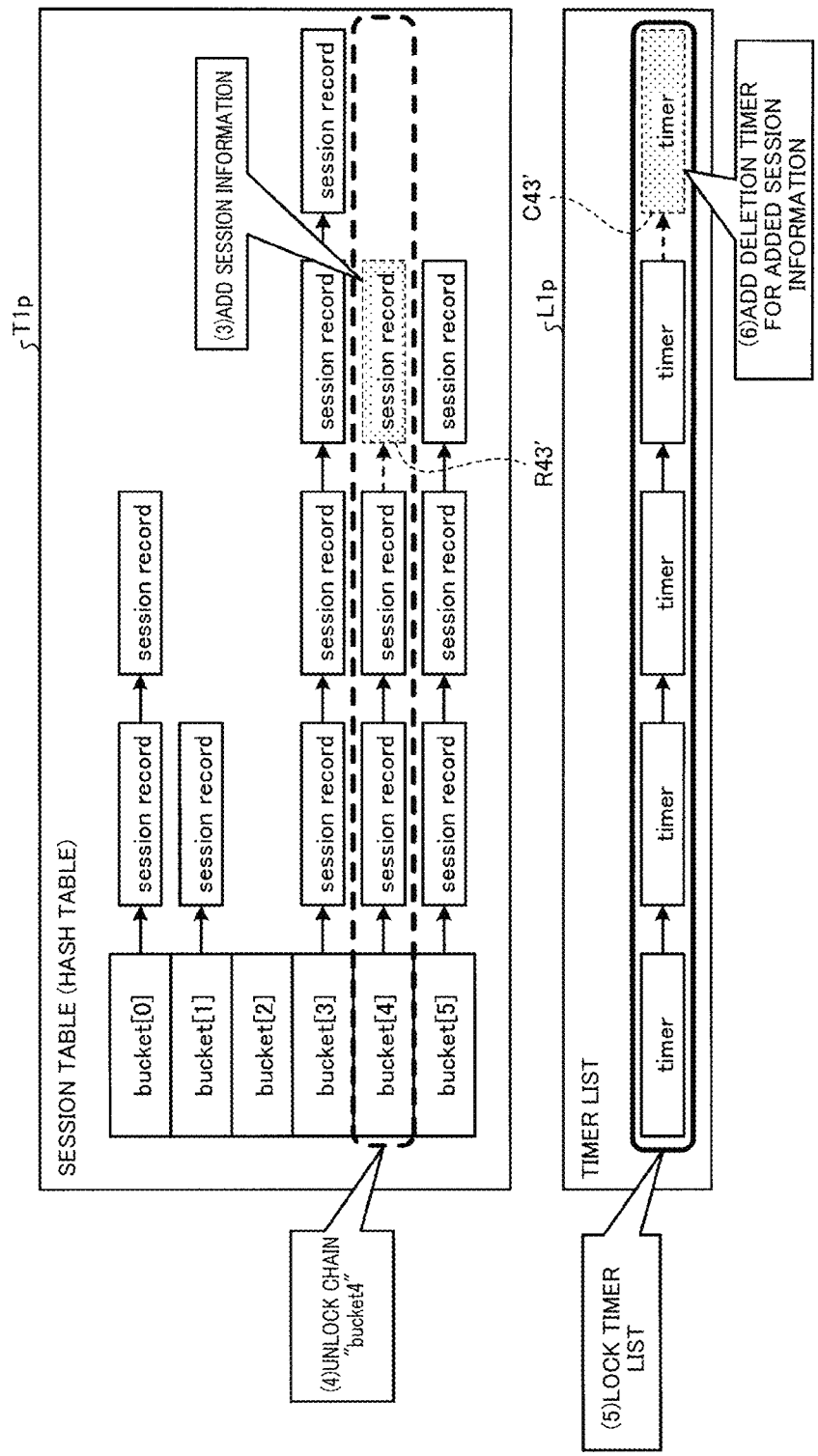
FIG. 9 is a diagram for describing a flow for processing of adding session information in conventional technology.
Figure 10:
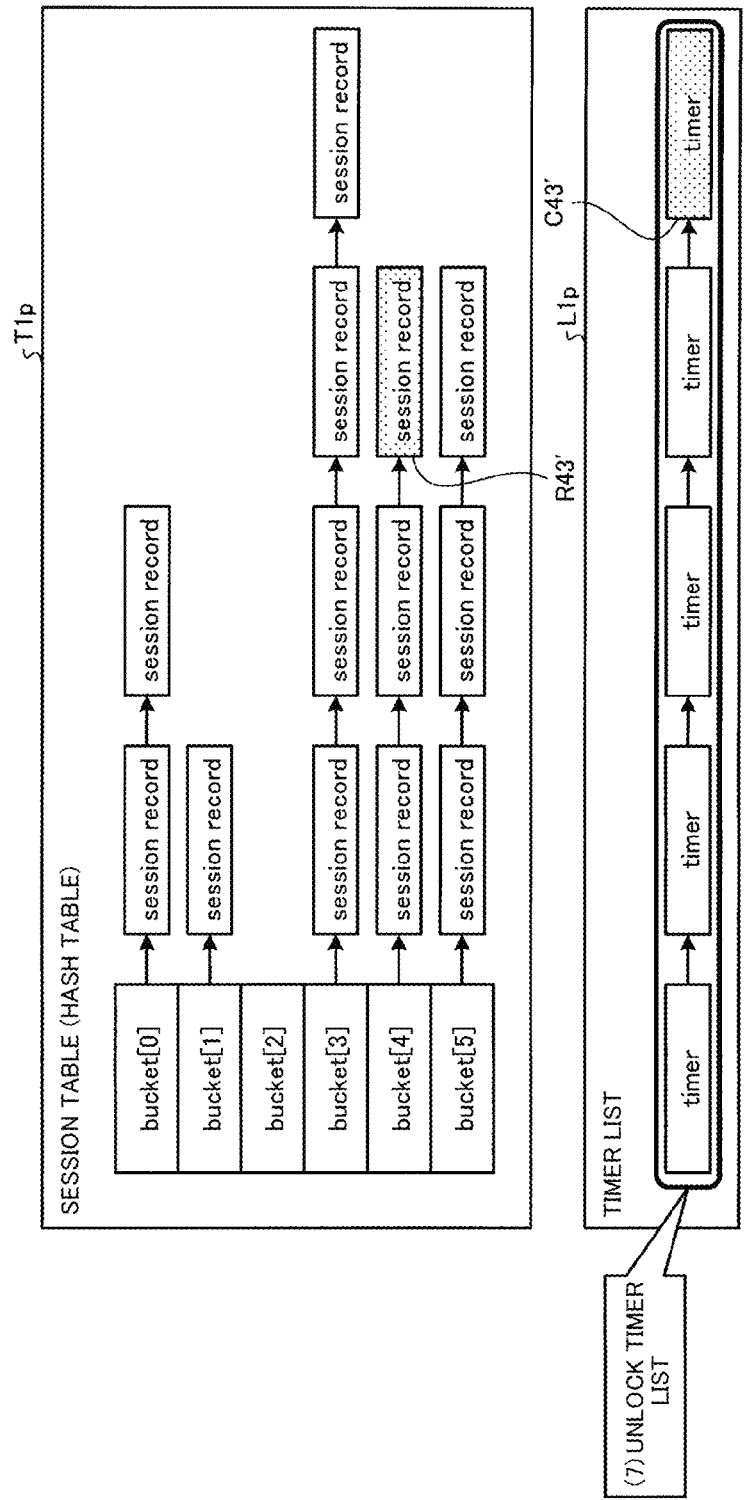
FIG. 10 is a diagram for describing a flow for processing of adding session information in conventional technology.

Now, processing of adding session information in the conventional technology will be described. FIG. 8 through FIG. 10 are diagrams for describing a flow for processing of addition of session information in the conventional technology. As illustrated in FIG. 8 through FIG. 10, a timer list L1p that has timer information of each piece of session information is conventionally provided, in addition to the session table (hash table) T1p. This timer list L1p is necessary in a case of deleting session information where communication has not been performed for a certain amount of time according to a timer, in order to prevent session information from continuing to remain due to an unexpected cutoff of the client 1 (cutoff without FIN/RST).

As illustrated in FIG. 8 through FIG. 10, in the conventional technology, the hash value "4" of the session information to be added is calculated (see (1) in FIG. 8), and out of the session table T1p, the chain "bucket4" corresponding to the hash value "4" is locked (see (2) in FIG. 8). In the conventional technology, session information R43' of the packet that is the object of adding is added to the end of "bucket4" (see (3) in FIG. 9), and the chain "bucket4" is unlocked (see (4) in FIG. 9).

Further, in the conventional technology, the timer list L1p is locked (see (5) in FIG. 9), and a deletion timer C43' of the added session information R43' is added (see (6) in FIG. 9). Then, in the conventional technology, the timer list L1p is unlocked (see (7) in FIG. 10), and the processing ends. In this way, there is the need in the conventional technology to perform locking and addition of a timer with regard to the timer list that exists separately from the session table.

Figure 11:
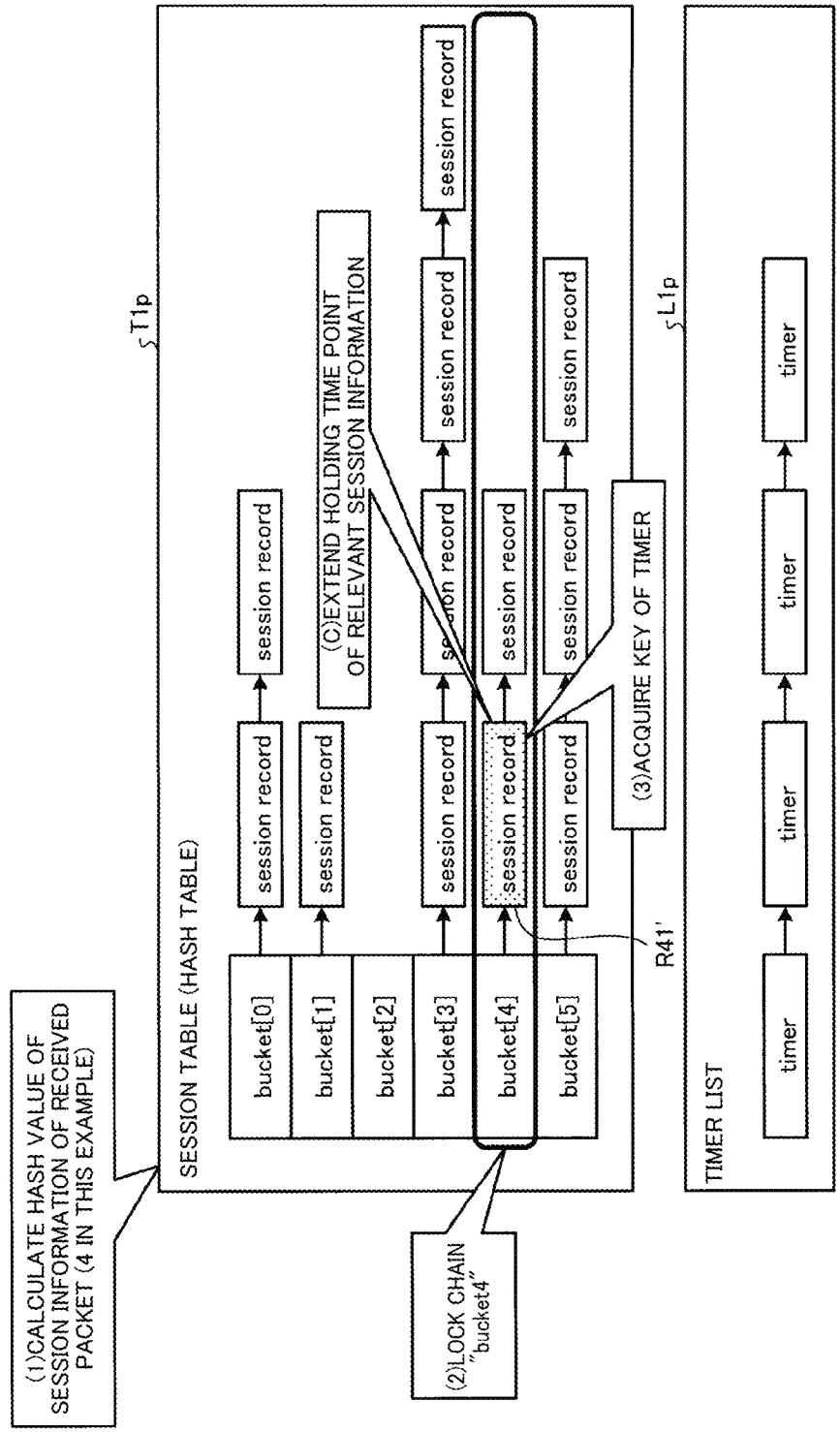
FIG. 11 is a diagram for describing a flow for processing of extending holding time point of session information in conventional technology.
Figure 12:
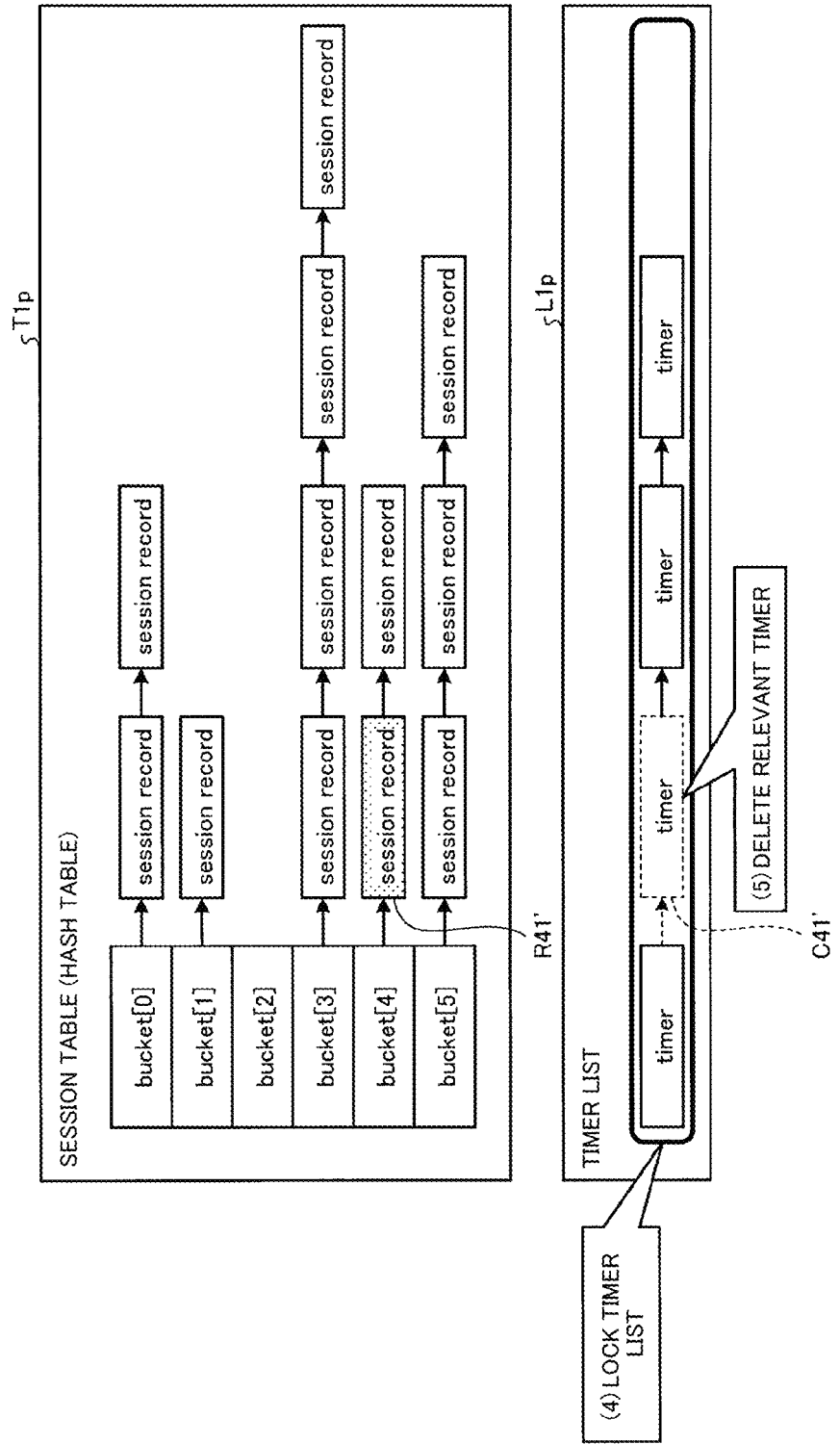
FIG. 12 is a diagram for describing a flow for processing of extending holding time point of session information in conventional technology.
Figure 13:
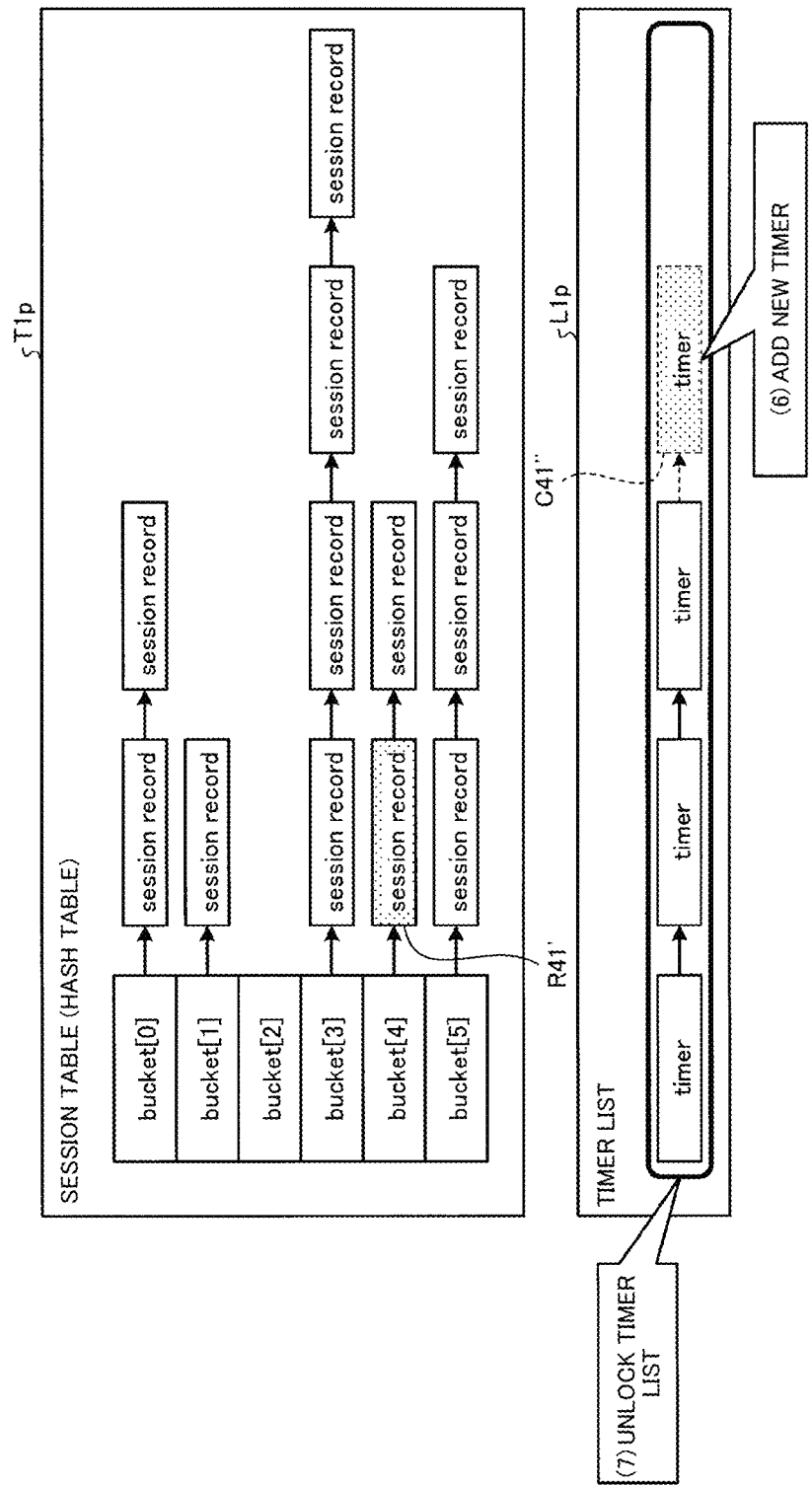
FIG. 13 is a diagram for describing a flow for processing of extending holding time point of session information in conventional technology.

Also, processing of extending the holding time point of session information in the conventional technology will be described. FIG. 11 through FIG. 13 are diagrams for describing a flow for processing of extending the holding time point of session information in the conventional technology.

As illustrated in FIG. 11 through FIG. 13, in the conventional technology, the hash value "4" of the session information of a received packet is calculated (see (1) in FIG. 11), and the chain "bucket4" of the session table T1p is locked (see (2) in FIG. 11). In the conventional technology, in order to extend the holding time point of relevant session information R41'(see (C) in FIG. 11), the key of the timer for this session information R41' is acquired (see (3) in FIG. 11).

Next, in the conventional technology, the timer list L1p is locked (see (4) in FIG. 12), and the timer C41' corresponding to the acquired key is deleted from the timer list L1p (see (5) in FIG. 12). Then, in the conventional technology, a new timer C41" for extending the holding time point is added (see (6) in FIG. 13). Thereafter, the timer list L1p is unlocked (see (7) in FIG. 13), and the processing ends.

Figure 14:
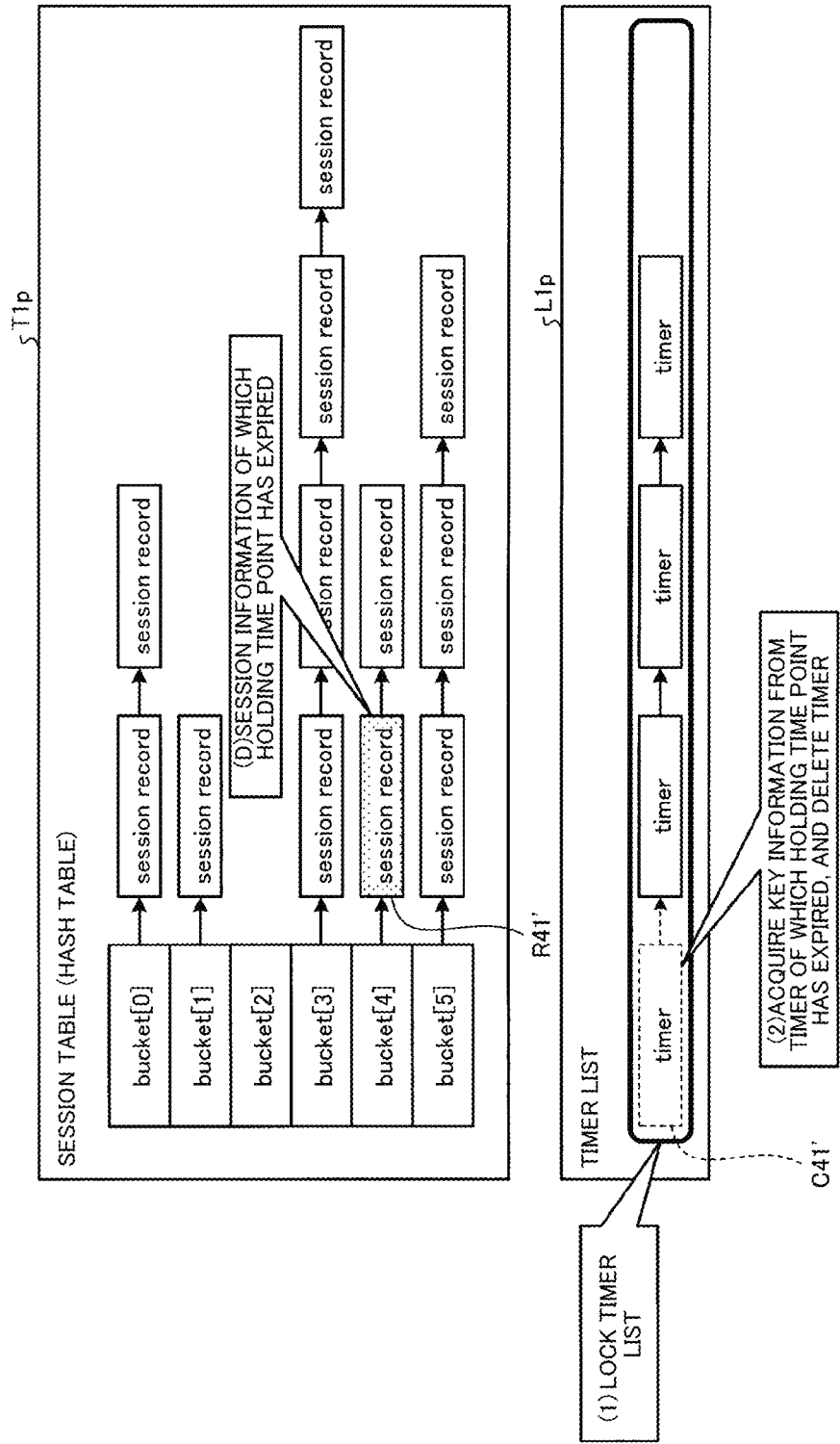
FIG. 14 is a diagram for describing a flow for processing of deleting session information in conventional technology.
Figure 15:
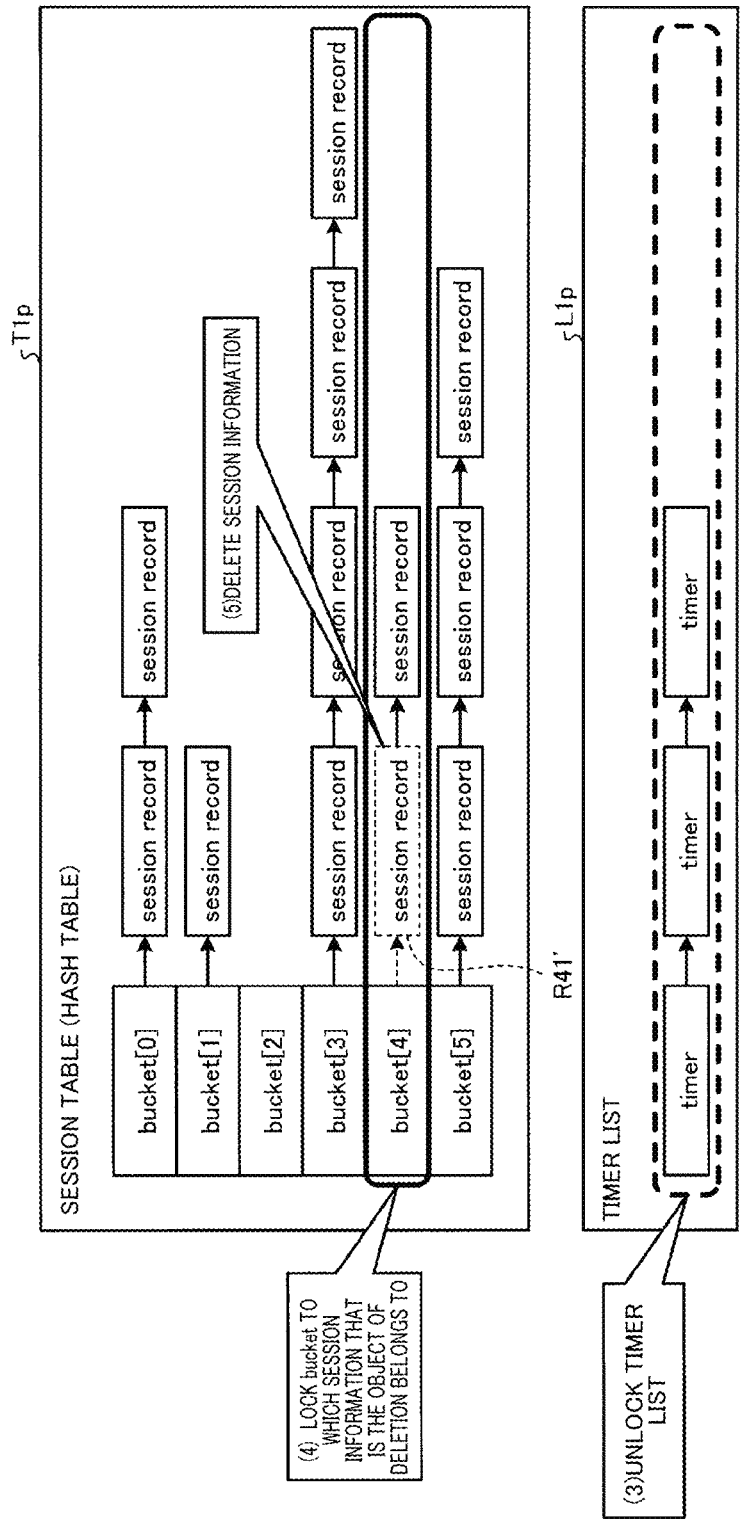
FIG. 15 is a diagram for describing a flow for processing of deleting session information in conventional technology.

Also, processing of deleting session information in the conventional technology will be described. FIG. 14 and FIG. 15 are diagrams for describing a flow for processing of deleting session information in the conventional technology.

As illustrated in FIG. 14 and FIG. 15, in the conventional technology, in a case of deleting session information R41' of which the holding time point has expired (see (D) in FIG. 14) from the session table T1p, first, the timer list L1p is locked (see (1) in FIG. 14), key information is acquired from the timer C41' of which the holding time point has expired, and the timer C41' is deleted from the timer list L1p (see (2) in FIG. 14).

In the conventional technology, the timer list L1p is unlocked (see (3) in FIG. 15), and the chain "bucket4", to which the session information in the session table T1p that is the object of deleting belongs, is locked (see (4) in FIG. 15). Thereafter, in the conventional technology, the C41' of the session information of which the acquired key matches is deleted from the session table T1p.

In this way, in the conventional technology, locking of the timer list L1p in addition to the session table T1p is necessary in order to add session information and to extend holding time point of session information. Also, in the conventional technology, the session table needs to be locked after locking the timer list in order to delete session information. In this way, in conventional technology, the number of times of performing lock acquisition at the time of processing session information is great, and the frequency of lock conflict occurring has been high.

Advantages of the Present Embodiment

In comparison with this, the information processing device 10 according to the present embodiment stores a session table where session information having session content and holding time point of the session is recorded. In other words, the information processing device 10 has both the session content and holding time point of the session embedded in session information recorded in the session table.

Accordingly, the timer list itself, which had been stored separately from the session table in the conventional technology, becomes unnecessary according to the information processing device 10. As a result, according to the information processing device 10, processing costs for operations of data structures managing timers can be reduced as compared with the conventional technology.

Also, the information processing device 10 locks only at least a region of the session table that is the object of processing while performing processing on session information, scans session information of the session table after locking, and searches for session information that is the object of processing.

As described above, the timer list itself is unnecessary as compared with the conventional technology, so locking of the timer list itself becomes unnecessary in the information processing device 10. Thus, according to the information processing device 10, locking of the timer list, which had conventionally been necessary, becomes unnecessary when performing operations of the session table, is the number of times of locking can be reduced as compared with that conventionally performed.

Also, in a case of discovering session information of which the holding time point has expired during scanning of the session table, the information processing device 10 deletes the session information of which the holding time point has expired. In other words, in a case where session information of which the holding time point has expired is discovered at the timing of searching for session information, the information processing device 10 deletes this session information. Accordingly, individually performing deletion processing of session information, which has conventionally been necessary, does not have to be performed with the information processing device 10, since session information of which the holding time point has expired is deleted under a lock acquired at the time of searching or adding.

Thus, according to the information processing device 10, the number of times of lock acquisition can be reduced as compared with that conventionally performed. Accordingly, the information processing device 10 can reduce the frequency of lock conflict reduction occurring, as well.

Note that while a chain-structure session table has been employed in the present embodiment, it is needless to say that an open-address structure session table can be employed as well. In this case, the locking unit 133 can lock the entire session table during processing of session information, and thereafter the searching unit 134 can scan the session information in the session table.

Also, the present embodiment is applicable to various types of protocols, such as TCP sessions, NAT sessions, HTTP session, and so forth, and is not restricted to any particular protocol.

[System Configuration, etc.]

The components of the devices illustrated in the Figures are functionally conceptual, and are not necessarily physically configured as illustrated in the Figures. That is to say, specific forms of dispersion/integration of the devices are not limited to those illustrated in the Figures, and all or part may be configured functionally or physically dispersed/integrated in optional increments in accordance with various types of loads, usage conditions, and so forth. Further, all or an optional part of the processing functions carried out at each device may be realized by a CPU and a program executed for analysis by the CPU, or alternatively may be realized as hardware through wired logic.

Also, of the processes described in the present embodiment, all or part of processes described as being automatically performed can be manually performed. Alternatively, all or part of processes described as being manually performed can be automatically performed by known methods. Moreover, processing procedures, control procedures, specific names, and information including various types of data and parameters, shown in the above document and Figures, can be optionally changed unless specifically stated otherwise.

[Program]

Figure 16:
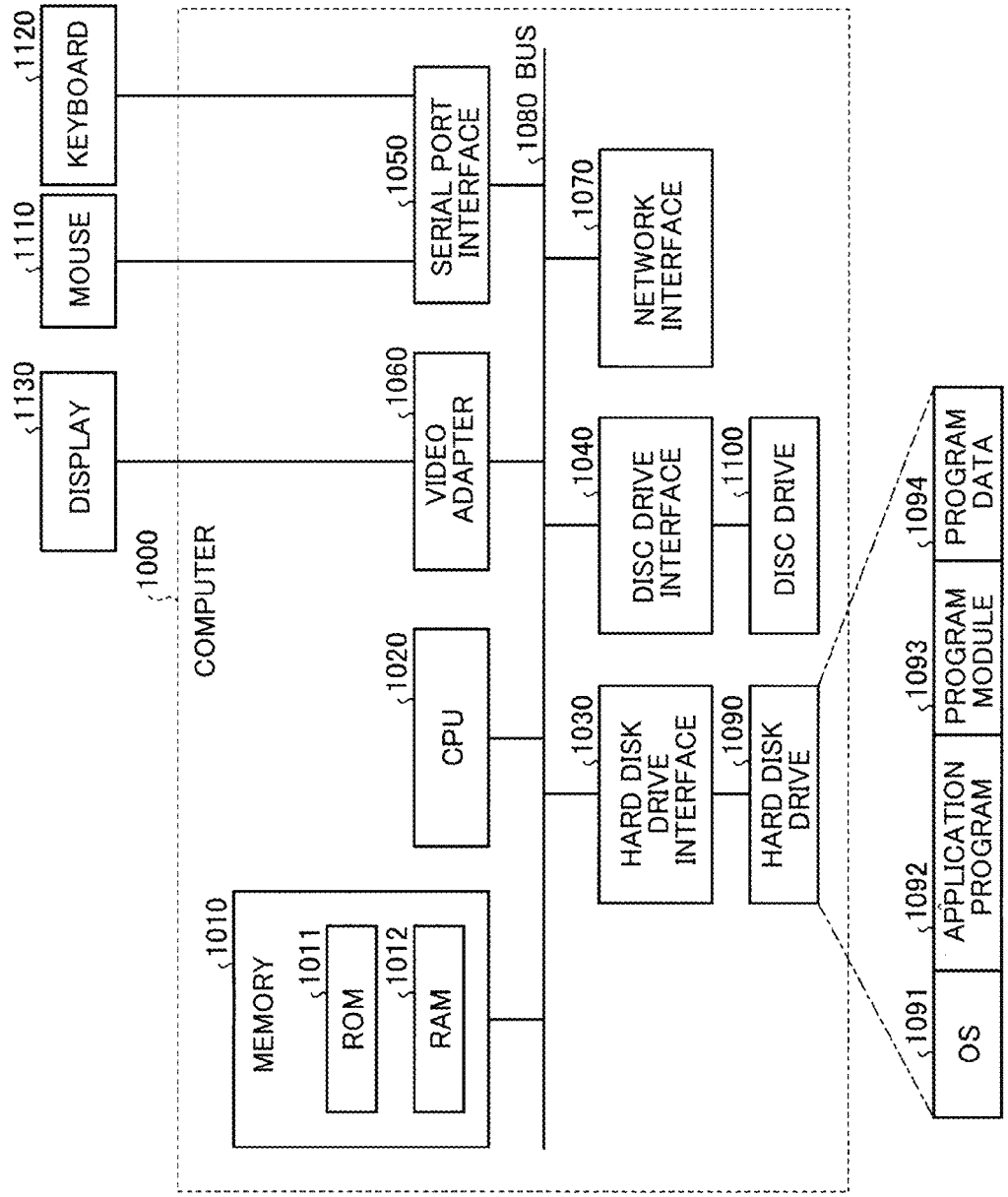
FIG. 16 is a diagram illustrating an example of a computer where an information processing device is realized by a program being executed.

FIG. 16 is a diagram illustrating an example of a computer where the information processing device 10 is realized by a program being executed. A computer 1000 has memory 1010 and a CPU 1020, for example. The computer 1000 also has a hard disk drive interface 1030, a disc drive interface 1040, a serial port interface 1050, a video adapter 1060, and a network interface 1070. These parts are connected by a bus 1080.

The memory 1010 includes ROM (Read Only Memory) 1011 and RAM 1012. The ROM 1011 stores a boot program such as a BIOS (Basic Input Output System), for example. The hard disk drive interface 1030 is connected to a hard disk drive 1090. The disc drive interface 1040 is connected to a disc drive 1100. A detachable storage medium such as a magnetic disk or optical disc or the like, for example, is inserted to the disc drive 1100. The serial port interface 1050 is connected to, for example, a mouse 1110 and keyboard 1120. The video adapter 1060 is connected to a display 1130, for example.

The hard disk drive 1090 stores, for example, an OS (Operating System) 1091, an application program 1092, a program module 1093, and program data 1094. That is to say, a program that defines each processing of the information processing device 10 is implemented as a program module 1093 in which code that is executable by the computer is described. The program module 1093 is stored in the hard disk drive 1090, for example. A program module 1093 for executing the same processing as the functional configurations of the information processing device 10, for example, is stored in the hard disk drive 1090. Note that an SSD (Solid State Drive) may substitute for the hard disk drive 1090.

Also, settings data used in processing in the above-described embodiment is stored in the memory 1010 or hard disk drive 1090, for example, as the program data 1094. The CPU 1020 then reads the program module 1093 and program data 1094 stored in the memory 1010 or hard disk drive 1090 to the RAM 1012 as necessary, and performs execution thereof.

Note that the program module 1093 and program data 1094 is not limited to a case of being stored in the hard disk drive 1090, and may be stored in a detachable storage medium for example, and be read out by the CPU 1020 via the disc drive 1100 or the like. Alternatively, the program module 1093 and program data 1094 may be stored in another computer connected via a network (LAN, WAN (Wide Area Network), etc.). The program module 1093 and program data 1094 may then be read out from the other computer by the CPU 1020 via the network interface 1070.

An embodiment to which an invention made by the present inventor has been applied has been described above, but the present invention is not limited by the description and Figures making up a part of the disclosure of the present invention by way of the present embodiment. That is to say, other embodiments, examples, operational technology, and so forth, made by one skilled in the art or the like on the basis of the present embodiment, are all encompassed by the scope of the present invention.

REFERENCE SIGNS LIST

1 Client
10 Information processing device
11 Communication unit
12 Storage unit
13 Control unit
121 Session table storage unit
131 Packet processing unit
132 Hash calculating unit
133 Locking unit
134 Searching unit
135 Deleting unit
136 Adding unit
137 Extending unit

The invention claimed is:

1. An information processing device in which is implemented a session table, the information processing device comprising:
 a storage unit that stores a session table in which is recorded session information having session content and holding time point of the session, the session table storing a plurality of chains, at least one of the plurality of chains storing session records of a plurality of sessions, each of the session records storing session content and time information for a corresponding one of the plurality of sessions, wherein the time information comprises at least embedded holding time points of the sessions;
 a locking unit that locks at least one of the plurality of chains of the session table that is an object of processing, during processing on the session information;
 a searching unit that:
  scans session information of the session table after locking by the locking unit,
  searches for session information that is an object of processing, and confirms the holding time point of the session information to be one of expired or not expired;

an extending unit that, in a case where the session information of which the holding time point has not expired is discovered at the time of scanning by the searching unit, the holding time point is extended and updated in the session table; and a deleting unit that, in a case where the session information of which the holding time point has expired is discovered at the time of scanning by the searching unit, the session information of which the holding time point has expired is deleted from the session table.

2. The information processing device according to claim 1, farther comprising: a packet processing unit that processes a packet; and an adding unit that, in a case where the searching unit cannot find, in the session table, session information of a packet that the packet processing unit has newly received, adds session information of the packet that has been newly received to the session table.

3. The information processing device according to claim 2, further comprising: wherein the extending unit extends and updates a holding time point of session information of a packet that the packet processing unit has received, wherein the searching unit searches session information of the packet that has been received from the session table, and wherein the extending unit extends and updates the holding time point of the session information that the searching unit has found.

4. An information processing method executed by an information processing device in which is implemented a session table, the information processing device including a storage unit that stores a session table in which is recorded session information having session content and holding time point of the session, the session table storing a plurality of chains, at least one of the plurality of chains storing session records of a plurality of sessions, each of the session records storing session content and time information for a corresponding one of the plurality of sessions, wherein the time information comprises at least embedded holding time points of the sessions, the information processing method comprising:

a locking step of locking at least one of the plurality of chains of the session table that is an object of processing, during processing on the session information;

searching steps of;

scanning session information of the session table after locking in the locking step, searching for session information that is an object of processing; and confirming the holding time point of the session information to be one of expired or not expired;

an extending step that, in a case where the session information of which the holding time point has not expired is discovered at the time of scanning by the searching unit, the holding time point is extended and updated in the session table; and a deleting step where, in a case where the session information of which the holding time point has expired is discovered at the time of scanning in the searching step, the session information of which the holding time point has expired is deleted from the session table.

5. A non-transitory, computer-readable storage medium storing an information processing program causing a computer to function as the information processing device according to claim 1.

* * * * *